(12) United States Patent
Monse et al.

(10) Patent No.: US 7,894,336 B2
(45) Date of Patent: Feb. 22, 2011

(54) BREAKDOWN AND DECOUPLING TOLERANT COMMUNICATIONS NETWORK, A DATA PATH SWITCHING DEVICE AND A CORRESPONDING METHOD

(75) Inventors: Matthias Monse, Nürnberg (DE); Harold Meis, Burgthann (DE)

(73) Assignee: Baumuller Anlagen-Systemtechnik, Nuremberg (DE)

( * ) Notice: Subject to any disclaimer, the term of this patent is extended or adjusted under 35 U.S.C. 154(b) by 376 days.

(21) Appl. No.: 11/911,156

(22) PCT Filed: Apr. 18, 2006

(86) PCT No.: PCT/EP2006/061624

§ 371 (c)(1),
(2), (4) Date: Oct. 10, 2007

(87) PCT Pub. No.: WO2006/108881

PCT Pub. Date: Oct. 19, 2006

(65) Prior Publication Data

US 2008/0170495 A1    Jul. 17, 2008

(30) Foreign Application Priority Data

Apr. 14, 2005    (EP)    ................... 05102973

(51) Int. Cl.
*G01R 31/08* (2006.01)
*H04L 12/28* (2006.01)

(52) U.S. Cl. .................. 370/222; 370/244; 370/404
(58) Field of Classification Search ........... None
See application file for complete search history.

(56) References Cited

U.S. PATENT DOCUMENTS

| 4,899,142 | A | * | 2/1990 | Nakayashiki et al. ....... 370/224 |
| 5,317,198 | A | | 5/1994 | Husbands et al. |
| 5,530,694 | A | | 6/1996 | Guezou et al. |
| 5,661,720 | A | | 8/1997 | Taniguchi et al. |

(Continued)

FOREIGN PATENT DOCUMENTS

DE    3836773    5/1990

(Continued)

*Primary Examiner*—Nittaya Juntima
(74) *Attorney, Agent, or Firm*—Frank H. Foster; Kremblas & Foster

(57) ABSTRACT

The invention relates to a method for tolerating the breakdown and/or decoupling of at least one network node in a communication network used for controlling and/or adjusting the movement of a plurality of machine parts, for example the rotation bodies in a printing machines, machine tools and other production machines, wherein the network is operated according to a closed single or multiple ring structure, in which each node communicates with the transmitter or the port of a first adjacent node by means of a receiver or a first port and with the receiver or the port of a second adjacent network node by means of a transmitter or a second port, the closed ring structure is preserved in the case of the breakdown or decoupling of at least one node, at least one network node is coupled to the network by means of a data path switching device which is actuated, in the case of the breakdown or decoupling of said node, in such a way that the communicating nodes, which exist in the network and are arranged next to each other in the ring structure, interact in communication by means of the port or respective transmitter thereof after the breakdown or decoupling.

8 Claims, 8 Drawing Sheets

U.S. PATENT DOCUMENTS

| | | | |
|---|---|---|---|
| 6,034,798 A | 3/2000 | Oeberg et al. | |
| 6,167,026 A | 12/2000 | Brewer et al. | |
| 6,680,903 B1 * | 1/2004 | Moriguchi et al. | 370/216 |
| 7,551,851 B2 * | 6/2009 | Zirnheld et al. | 398/3 |
| 2006/0212604 A1 * | 9/2006 | Beckhoff et al. | 709/251 |

FOREIGN PATENT DOCUMENTS

| | | |
|---|---|---|
| DE | 19722189 | 12/1998 |
| JP | 04 125340 | 5/1992 |
| WO | WO 2005/029781 | 3/2005 |

* cited by examiner

BREAKDOWN AND DECOUPLING TOLERANT COMMUNICATIONS NETWORK, A DATA PATH SWITCHING DEVICE AND A CORRESPONDING METHOD

CROSS-REFERENCES TO RELATED APPLICATIONS

This application is a submission to enter the national stage under 35 U.S.C. 371 for international application number PCT/EP/2006/061624 having international filing date Apr. 18, 2006, for which priority was based upon patent application 05102973.4 having a filing date of Apr. 14, 2005 filed in European Patent Office.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention concerns a method for tolerating a breakdown and/or a decoupling of at least one network node in, e.g. from a communication network. This is used for controlling and/or adjusting the movement of a plurality of machine parts, for example rotation bodies in printing, machines, machine tools, or other production machines. The network is operated accordingly as a closed, single or multiple ring structure. The term "multiple ring structure" is to be understood to mean redundant ring structures such as double rings as well as the decoupling of several independently closed ring (part) networks. Within the network each node communicates by means of a first receiver or port with a transmitter or port of a first adjacent node, and by means of a second transmitter or port with a receiver or port of a second adjacent node. During the breakdown or decoupling of at least one of the nodes the closed ring structure is maintained. The invention further concerns a data path switching device suitable for carrying out the method, which incorporates internal input and output side data connection means, a multi-port connection means for the communication technical connection of a plurality of network nodes, network or field bus segments, separate networks and/or other network configurations as well as a communication network, structured and organised according to a single or multiple ring topology, with which a plurality of network nodes, network or field bus segments, separate networks and/or other network configurations are coupled.

2. Description of the Related Art

With process automation networks there exists the tendency of integrating data transmission protocols from the office and Internet world. New standards for driver interfaces such as SERCOS III and EtherCAD have contributed to this, where elements of the network type "Ethernet" from the office environment are used under real time conditions (so-called "Real Time Ethernet Field Bus"). For tolerating the breakdown of individual nodes ("single breakdowns") these communication systems are equipped with double ring structures, where two independent communication channels enable opposite ring transmissions. This results from Ethernet physics. Due to the therefore redundant data transfer the communication capability is preserved completely at any point of the ring during a cable break or a user/node breakdown. The interruption of the ring structure is in fact limited to the location of the breakdown. When a line breakdown and/or a node breakdown occurs the communication master will still be able to control the ring sections located to both sides of the location of the breakdown and interruption.

However, if two separate, e.g. spatially distant ring sections of the known communication double ring described above break down, the users/nodes of the communication system between the broken down or even switched off sections are no longer accessible via the ring to the communication master or another controller.

A data transmission system for machine tools and production machines as well as robots is known from EP-B-1 249 763 (Siemens AG). From a central data line other data lines, in which signal processing units with transmitters and receivers are located, branch off at intervals. The latter serially transmit the data within a ring structure. Individual ring networks are each controlled by a communication master, which are in turn compiled into a closed separate ring structure, so that a breakdown of a communication master will not result in the entire communication structure breaking down. The communication masters are supported by standby communication masters, which are coupled with adjacent communication masters via additional lines installed according to the by-pass principle. If one communication master with a group leader function breaks down, the standby communication masters will guarantee that a ring-shaped part communication structure will continue to function. The standby communication master will seamlessly take over the group leader function in this case, and will dominate the signal processing units of the associated part communication ring. With the aid of the additional connections (by-pass lines) the relevant broken down communication master is bridged. However, these data, e.g. communication by-pass lines will result in a clearly increased and confusing hardware requirement. In addition there is no prevention mechanism guarding against a multiple breakdown or switch-off of subordinate slave signal processing nodes.

In DE-A-101 29 572 (Siemens AG) a data path selection means with a plurality of data connections for a wired data transmission system is described. Any number of data connections can be located between the data connections of the data path selection means. Communication networks can be coupled with other communication networks in this way. The use of real time enabled Ethernets for ring-shaped networked drive controllers is also mentioned. If one machine unit and/or the drives of the same break down, the same can be decoupled from the data communication by means of the data path selection means. For this a data technical re-allocation of the remaining signal processing units/drive controllers to associated machine parts within the overall control network is carried out by means of the data selection means.

BRIEF SUMMARY OF THE INVENTION

It is the purpose of the invention to increase the operatability and maintainability of a ring-shaped field bus or similar ring communication system. This task is solved according to the invention by the breakdown and/or decoupling method described in Claim 1. Preferred optional embodiments of the invention result from the dependent Claims.

According to the invention the network nodes/users are coupled via a switching device with the data path or paths of the ring-like network, and can bridge gaps in the ring chain of nodes that will occur when one or even several breakdowns or decouplings/separations are recorded by means of the switching device in one or both switching directions by diverting the data path or paths. The data stream that up to that point had flowed via the now broken down or decoupled node is now diverted by the switching device in such a way that this node is avoided in the way of a by-pass. The switching device ensures that adjacent users within the ring network that are still intact and functional are newly coupled with their transmitters and receivers for exchanging data.

With the invention it is possible to equip the ring structure used with the advantages of a star topology, as the switching intelligence of the invention makes it possible to switch off each active node/communication user without affecting the ring communication. In this way it is possible to realise maximum availability, e.g. robustness with regard to breakdown.

In order to be able to initiate the self-repairing mechanism ("self repair") described above quickly and reliably the switching device is equipped with an internal, preferably hard wired logic according to one embodiment of the invention, which will initiate a diversion of the data streams, e.g. the data by-pass operation when a breakdown of a separation is recognised. The internal switching device logic can be programme and/or switching technically equipped for evaluating and processing breakdown recognition signals relating to the communication capability with external nodes. It is therefore within the scope of the invention that a receiver in the switching device of the invention generates a communication flag for breakdown recognition purposes, whereafter the external node will remain able or unable to communicate. The communication flag should be generated as quickly as possible to affect communication as little as possible. For this available status information from the Ethernet Physical Layer Transceivers can for example be connected in a suitable way. In the latter case the internal switching device logic ensures that the internal receiver as well as the broken down node coupled with the same is separated from the ring network. In the same way a node/user can be disconnected/separated from the ring network.

The scope of the invention includes for the internal switching device logic to be expanded in such a way that a process assembly or a processor means are envisaged, which can ensure a coupling of a data processing system that is different from the ring-shaped real time field bus. The data processing system can for example consist of a conventional office PC or a data transmission channel (IP channel) working according to Internet protocol.

With ring field busses working on the basis of the master/slave principle further development is possible with the said design of the invention in that the said processor means are programmed in such a way that the switching device can simultaneously work as a communication master for the ring-shaped network. A switching device designed in this way can further be equipped with one or more ports for the transmission of information, so that external communication systems can be connected. The switching device intelligence provided by the processor means can also be used with the aid of programming measures in the way of a software module to equip the switching procedure described above for the said re-directing of data streams in a case of a breakdown or separation of users/network nodes.

BRIEF DESCRIPTION OF THE SEVERAL VIEWS OF THE DRAWINGS

Further characteristics, details, (sub-)combinations, advantages and effects based on the invention result from the following description of preferred embodiments of the invention and the enclosed drawings, wherein.

Figure 1:
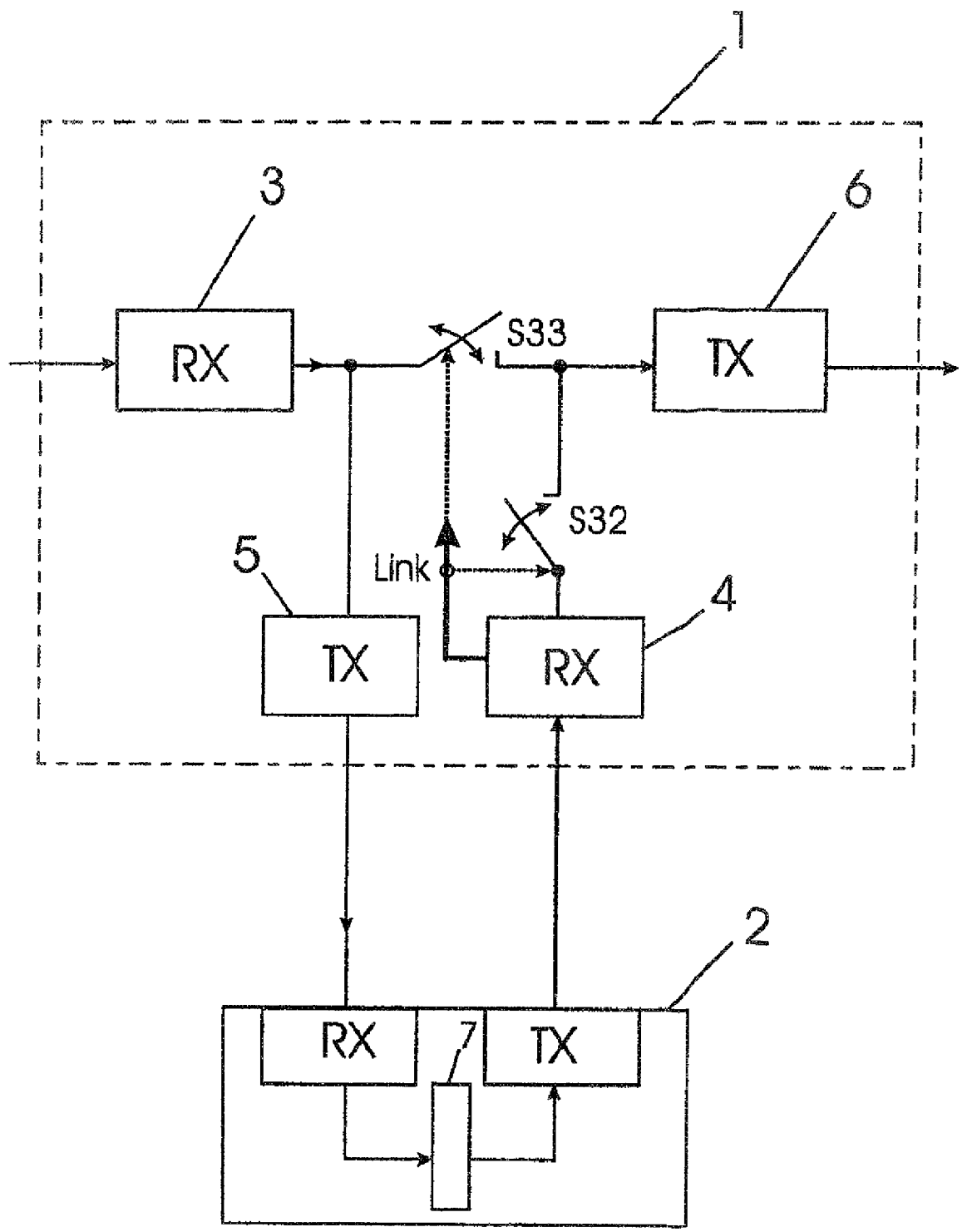
FIG. 1 shows a principle sketch of a data path switching device designed for a ring structure.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

According to FIG. 1 the data path switching device 1 shown is equipped with the data connection means RX, TX in order to communicate with a coupled network node 2 on the one hand, and with a further network node/user (not shown) on the other hand. The same is also equipped with data connection means RX, TX for this purpose.

The data connection means of the switching device 1 comprises a longitudinal receiver 3, a transverse receiver 4, a transverse transmitter 5, and a longitudinal transmitter 6. The input side longitudinal receiver 3 and the output side longitudinal transmitter 6 each serve for the communication with adjacent switching device or other nodes within the ring network. The two communication organs 3, 4 are similarly aligned "along the/in longitudinal direction of" the ring-shaped communication channel, which is where the term "longitudinal" receiver/transmitter originates. Figuratively speaking the communication means of the two other communication organs 4, 5 serving for coupling the node 2 extend "transverse" to the same (therefore known as "transverse" receiver/transmitter). The input of the transverse transmitter 5 is directly connected with the output of the longitudinal receiver 3, in the example shown here without an in-line switching of additional construction components. The output of the transverse transmitter 5 supplies the receiving organ RX of the coupled node 2. From there the data stream flows via an internal processing unit 7 within the node 2, which supplies its output data to the transverse receiver 4 of the switching device 1 via the transmission organ TX. The output of the same lies on a transverse breaker switch S32 used as an example here, which conducts the data stream to the input of the longitudinal transmitter 6 in a closed condition. The transverse receiver 4 comprises internal monitoring means (not shown), which react to the communication issued by the node 2, e.g. by the transmission organ TX of the same, and generate a corresponding communication flag "link". If link is "true", e.g. "1", communication is possible, if not, then it is not. If link is "false", e.g. "0", the transverse breaker switch S32 is activated, e.g. opened (illustrated by means of the broken line). The output of the transverse receiver 4 of the switching device 1 is then separated from the ring network. The flag "link" further controls an additional longitudinal breaker switch S33. In a case of link="true", e.g. "1", the longitudinal breaker switch S33 is in an open condition, so that the data stream arriving from the longitudinal receiver 3 cannot by-pass the coupled node 2. If a fault or a separation is detected there by the transverse receiver 4 this is recognised by means of the communication flag link="false", wherein the longitudinal breaker switch S33 is activated to close. With a closed longitudinal switch S33 and a simultaneously open transverse switch S32 the transverse communication organs 4, 5 of the switching device 1 are bridged, which also applies for the (formerly) coupled node 2. The data stream received from the remaining ring network travels from the transverse receiver 3 directly to the longitudinal transmitter 6, from where the same is transported to the ring network.

Figure 2:
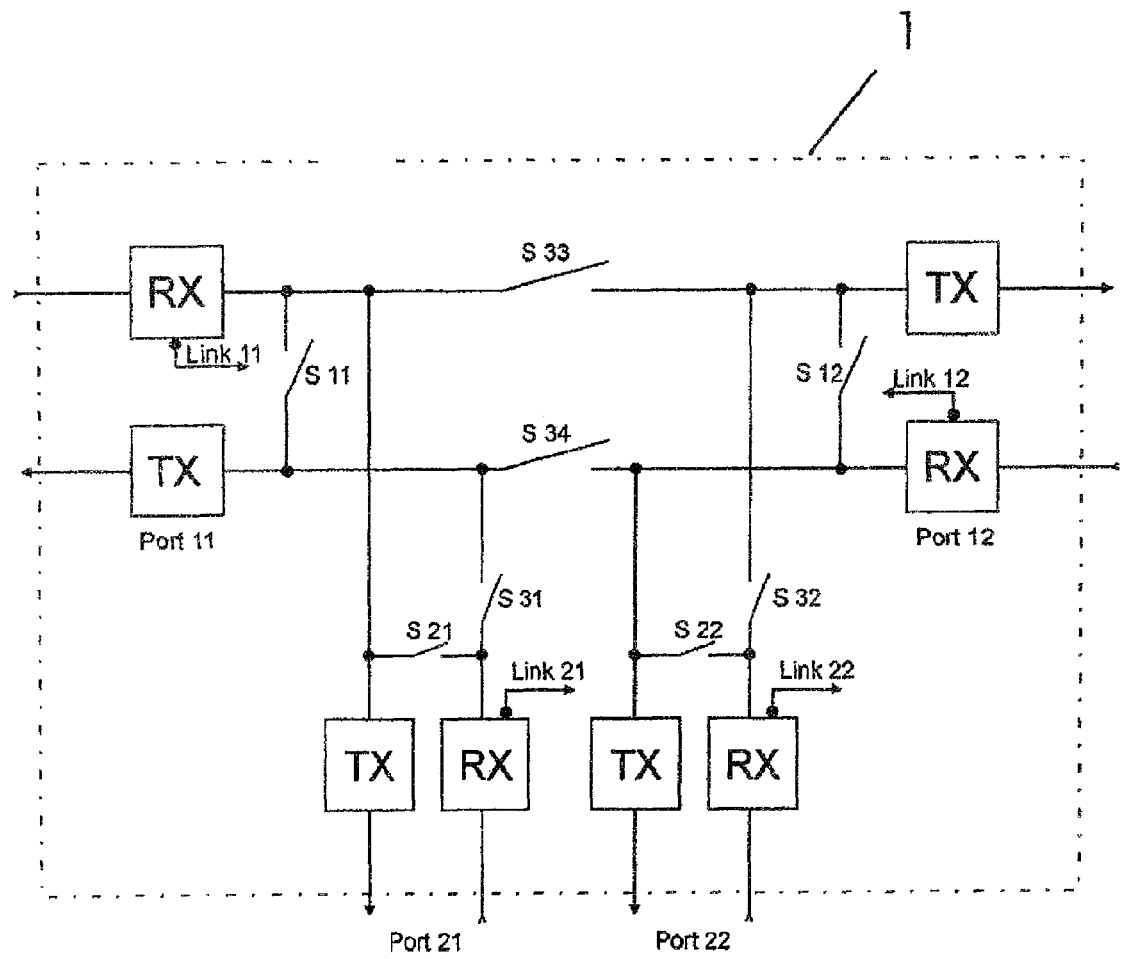
FIG. 2 shows a principle sketch of a data path switching device designed for a double ring.

According to FIG. 2 the monitoring means 1 designed for a double ring structure comprises four bi-directional ports for real time Ethernet communication, namely the two longitudinal ports 11, 12 and the two transverse ports 21, 22. These bi-directional real time ports form connections for connecting cables, with which one part section of the ring structure is realised. Each port consists of a connection, e.g. a transmitter TX, via which data is transmitted to the part section, and a connection, e.g. receiver RX, via which data is received from the part section. The receivers are equipped with logical conditions, e.g. characteristics, illustrated here by the communication flag "link". It becomes "true", e.g. "1", as soon as it is recognised that a user, e.g. node capable of communicating is transmitting to the receiver RX. If the capability to communicate is not present the link becomes "false", e.g. "0". In such a case an internal connection of the receiver output is independently connected with the transmitter input (so-called "loop-back operation"). If a communication partner is connected with a port in loop-back operation both ports will each recognise a link signal. The loop-back condition can be influenced by a communication master. Alternatively it is also within the scope of the invention that each port automatically, i.e. independently switches to loop-back operation according to its own communication flag "link".

According to FIG. 2 loop-back operation can be initiated in each of the ports by means of associated loop-back switches S11, S12, S21, S22, which connect, e.g. short circuit the receiver output and the transmitter input of a relevant port with each other when the relevant communication flag is "false", e.g. "0", which means when the same recognises a lack of communication capability in the connected user/node. For interrupting, e.g. separating the relevant transmitter input and receiver output the loop-back switches S11, S12, S21, S22 are controlled separately from each other when the relevant communication flag is "true", e.g. when a communication capability is recognised in the connected use/node. This function results from the following table:

S11 is closed when LINK(port11) = FALSE, otherwise open
S12 is closed when LINK(port12) = FALSE, otherwise open
S21 is closed when LINK(port21) = FALSE, otherwise open
S22 is closed when LINK(port22) = FALSE, otherwise open In the same way as for a double ring structure two longitudinal breaker switches S33, S34 each, and two transverse breaker switches S31, S32 each are envisaged. The longitudinal breaker switches S33, S34 will interrupt the two opposing data channels between the two longitudinal ports 11, 12 in an open condition, or will release the same for the data stream in a closed condition. For this one of the longitudinal breaker switches S33 is located between the receiver output of the first longitudinal port 11 and the transmitter input of the second longitudinal port 12, and the second longitudinal breaker switch S34 is located in the same way between the receiver output of the second longitudinal port 12 and the receiver input of the first longitudinal port 11. The two transverse breaker switches S31, S32 are located on the relevant receiver output of the two transverse ports 21, 22 on the one hand, and on the connection of the two longitudinal breaker switches S33, S34 that is nearest to the transmitter input of the two longitudinal ports 11, 12 each on the other. The function of the longitudinal and transverse breaker switches S31-S34 results from the following table:

(S33 AND S34) are closed when (LINK(port 21) = FALSE AND LINK(port 22) = FALSE, otherwise open
(S31 AND S32) are open when (LINK(port 21) = FALSE AND LINK(port 22) = FALSE, otherwise closed The two transverse ports 21, 22 can both be bridged by means of the longitudinal breaker switches S33, S34 with support from the transverse breaker switches S31, S32. With the specific use of at least the longitudinal switches S33, S34, and possibly also the transverse switches S31, S32 according to FIGS. 1 and 2 the initially interrupted communication ring can be closed once more, and data can be easily conveyed by the communication ring, although the node to be coupled has broken down or become separated from the communication ring. This is supported further in that the relevant transmitter input is short circuited with the receiver output in the relevant transverse port 21, 22 when link 21=false and link 22=false (loop-back operation). In order to prevent a further short circuit between the two connection lines running over the longitudinal breaker switches S33, S34 between the two longitudinal ports 11, 12 it is intended that the two transverse breaker switches S31, S32 will each be open in a case where no communication capability exists (communication flags link 21 and link 22 are each "false") and will prevent the lines from being bridged by the longitudinal switches during loop-back operation.

The switches S11-S34 are preferably electronically and/or hard wired, for example by means of semi-conductor switches. It is however also within the scope of the invention to realise the switching logic realised by means of the switches according to FIG. 1 or 2 with a programmed switching unit, programmable logic fields, and/or by means of software implemented via a micro-processor. To these building blocks the transmitters 5, 6 and the receivers 3,4 according to FIG. 1, or the ports 11, 12, 21, 22 would then be connected according to FIG. 2 if the same are not already integrated into the said components.

Figure 3A:
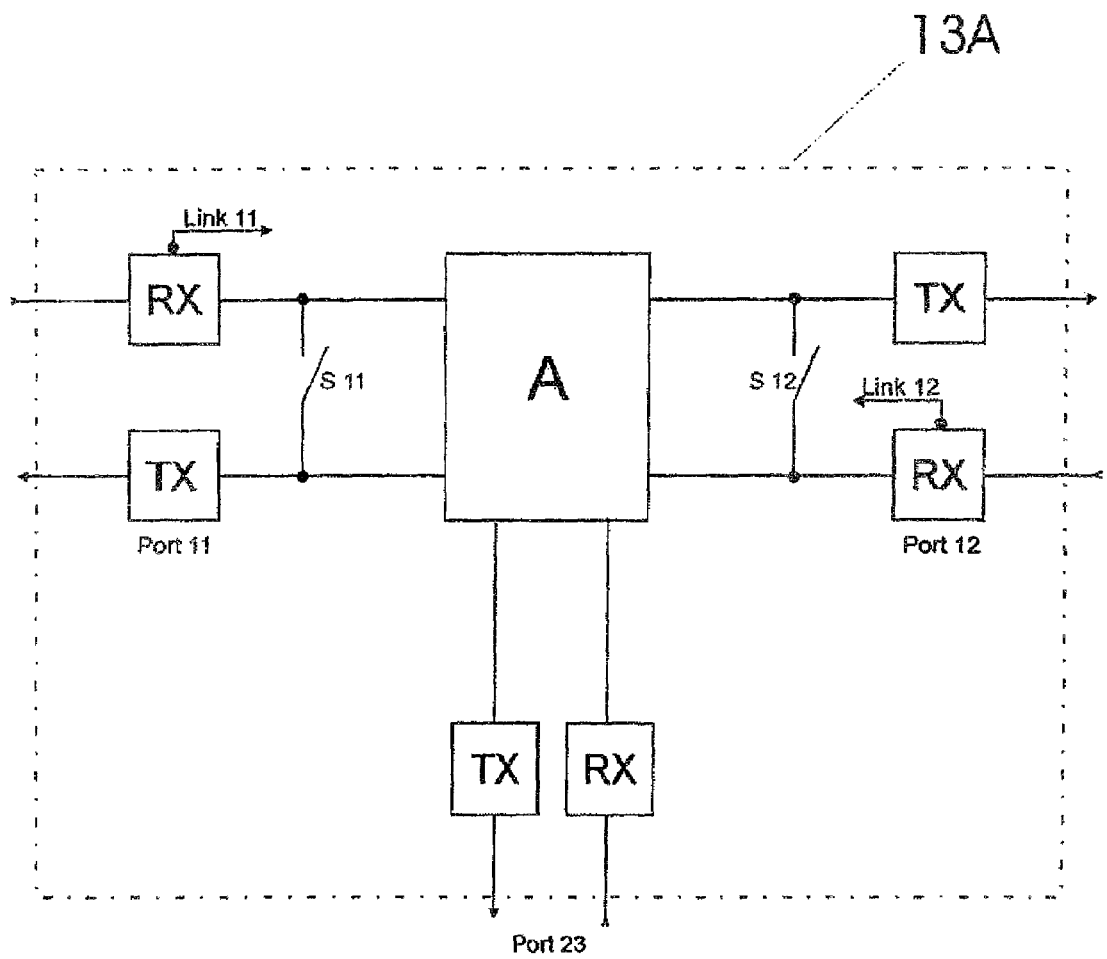
FIGS. 3A and 3M show a principle sketch of a coupling means working as a slave, e.g. master node realised with processor means.

According to FIG. 3A a coupling means for the coupling of, for example, one or more IP channels with the ring-like real time Ethernet field bus is envisaged. The coupling means 13 consists of two bi-directional longitudinal real time ports 11,12, each with associated loop-back switches S11, S12. Between the two longitudinal ports 11, 12 a process assembly A is located, in which the functionality of coupling is implemented. The IP channel can be connected via a bi-directional transverse port 23, wherein the connection with the process assembly A is realised. This can for example transport normal Ethernet telegrams obtained from the transverse port 23 and the connected IP channel by means of suitable software into the real time Ethernet field bus between the two longitudinal ports 11, 12. For this the functions of bus management and telegram communication are deposited in the process assembly A, for example with a so-called embedded PC. In addition the switching logic of FIGS. 1 and 2 can be, as already mentioned, be implemented into the process assembly A from a software point of view.

Figure 3M:
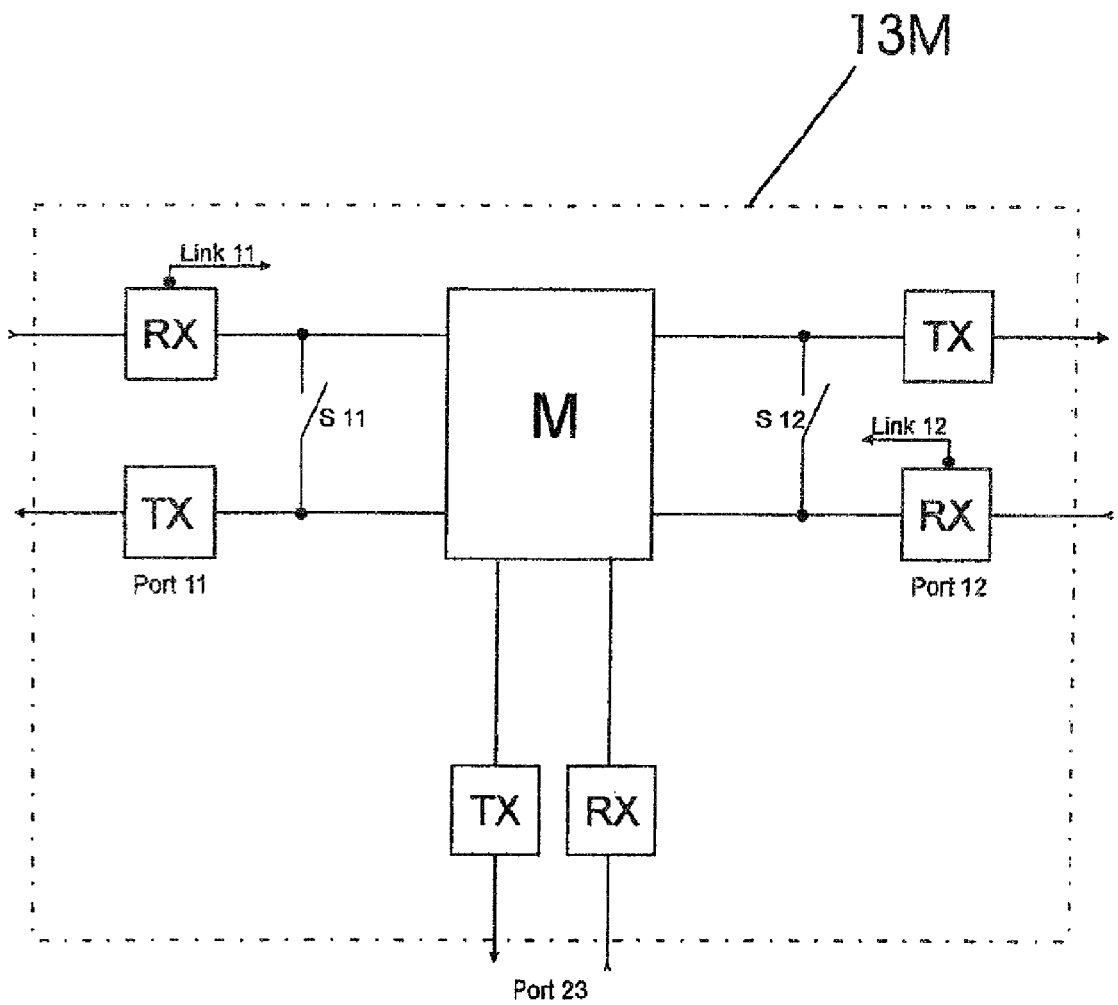

The latter also applies for the process assembly M shown in FIG. 3M in a master coupling means 13M. According to FIG. 3M the process assembly M has been expanded in such a way that the additional functions of a communication master have been provided (see "M" for the process assembly). For each real time Ethernet field bus only one process assembly M can be active. It can also (as shown for the process assembly A of FIG. 3A) support functions for the coupling of one or more IP ports. If further master coupling means 13M of this kind are provided in the same bus segment their master function remains inactive, and only the function for coupling IP ports or suchlike is usable.

With the coupling means 13A, 13M of FIGS. 3A, 3M standard Ethernet telegrams can be fed into real time Ethernet field bus with the ring structure in such a way that the transmission of real time data will not be disturbed. For this the bi-directional transverse port 23 provided as shown in FIG. 3A, e.g. FIG. 3M serves, wherein IP channels and suchlike can be switched into the ring-like real time Ethernet field bus.

Figure 4:
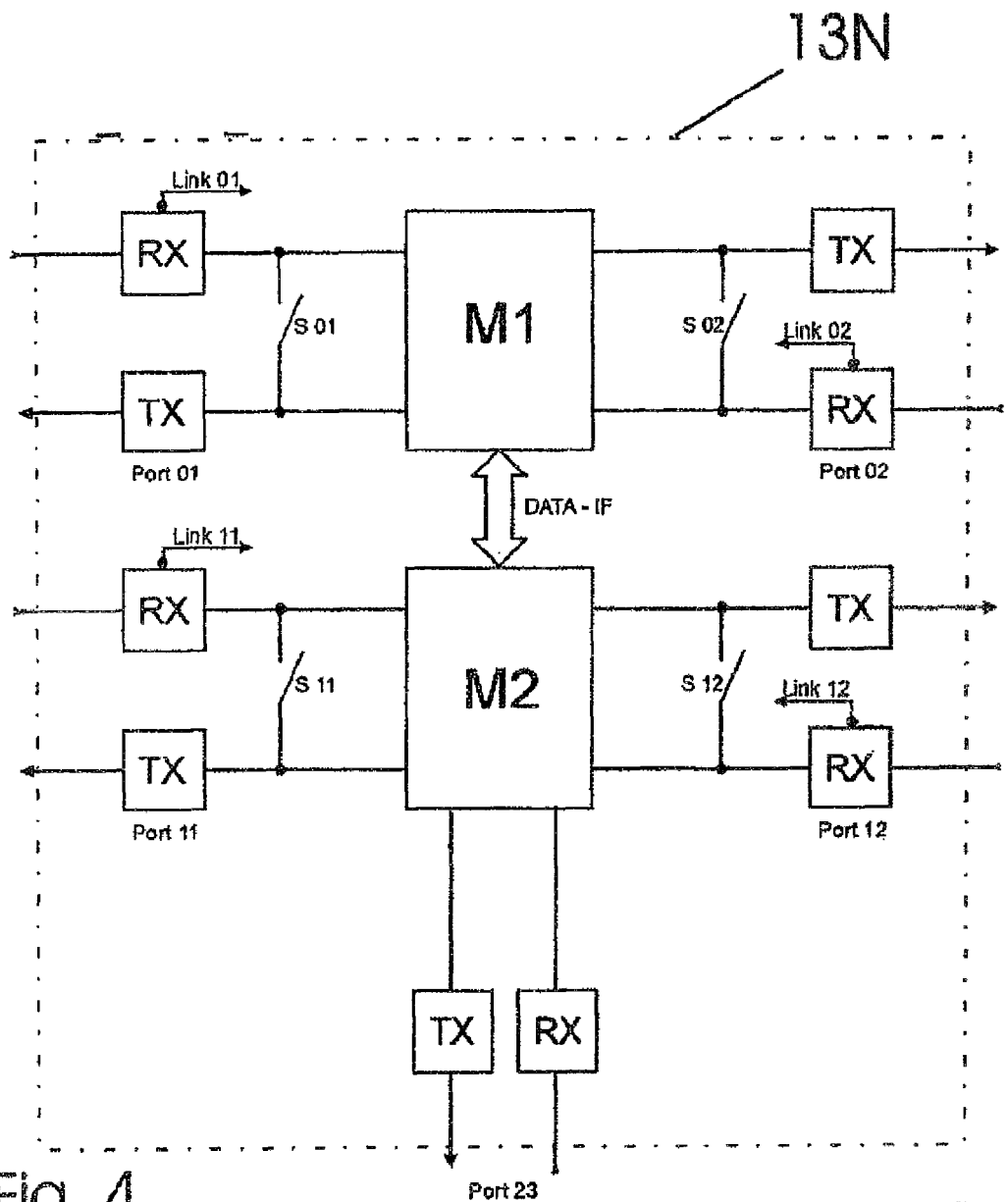
FIG. 4 shows a principle sketch of a coupling means equipped with a processor means for forming two master nodes.

According to FIG. 4 a network coupling means 13N comprises four bi-directional longitudinal real time ports 01, 02, 11 and 12, which are each associated with loop-back switches S01, S02, S11 and S12, as well as two process assemblies, e.g. processor units M1, M2, which can exchange data and information via an internal data interface DATA IF (preferably a parallel interface). The said switches S01-S12 are activated depending on the relevant receiver communication flag link 01, link 11, link 02, link 12. If the relevant communication flag indicates the communication capability of the external communication partner with the binary value "1" the associated switch is opened, otherwise it remains closed. The two process assemblies M1, M2 serve as communication master in a real time Ethernet field bus, namely optionally as communication master or as communication slave. With the data coupling, e.g. interface DATA IF between the two processor assemblies M1, M2 it is possible to exchange data content between the two separate field bus segments, each with their own communication master. The two process assemblies M1, M2 are each connected with two of the overall four longitudinal ports 01, 02, 11, 12. Via the longitudinal ports 01, 02 associated with the first process assembly M1 a connection with a real time Ethernet ring is possible. The same applies for the second process assembly M2 with the connected longitudinal ports 11, 12 in connection with a second, separate real time Ethernet ring. A coupling of these two Ethernet rings is therefore realised via the data interface DATA IF.

Figure 5:
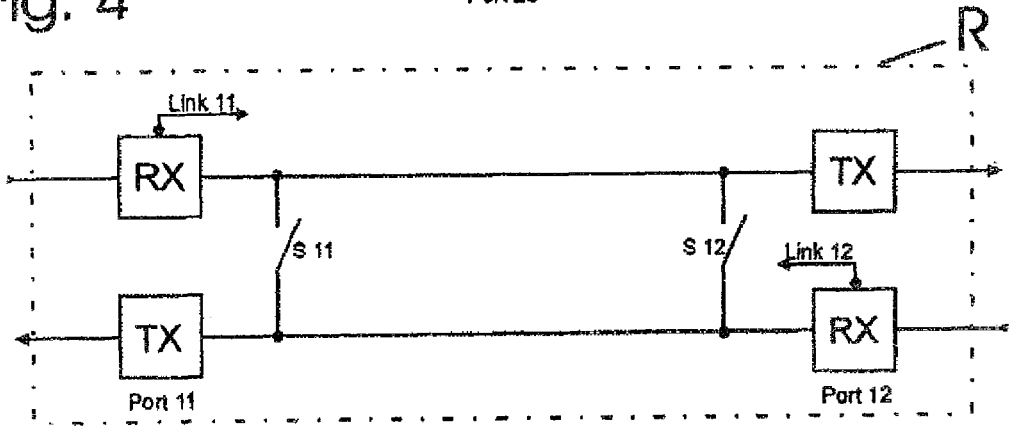
FIG. 5 shows a principle sketch of a network repeater.

For signal amplification a repeater is envisaged as shown in FIG. 5, which comprises two bi-directional real time ports 11, 12, each with an output for a communication flag link 11, link 12. Both longitudinal ports are each allocated a loop-back switch S11, S12.

Figure 6A:
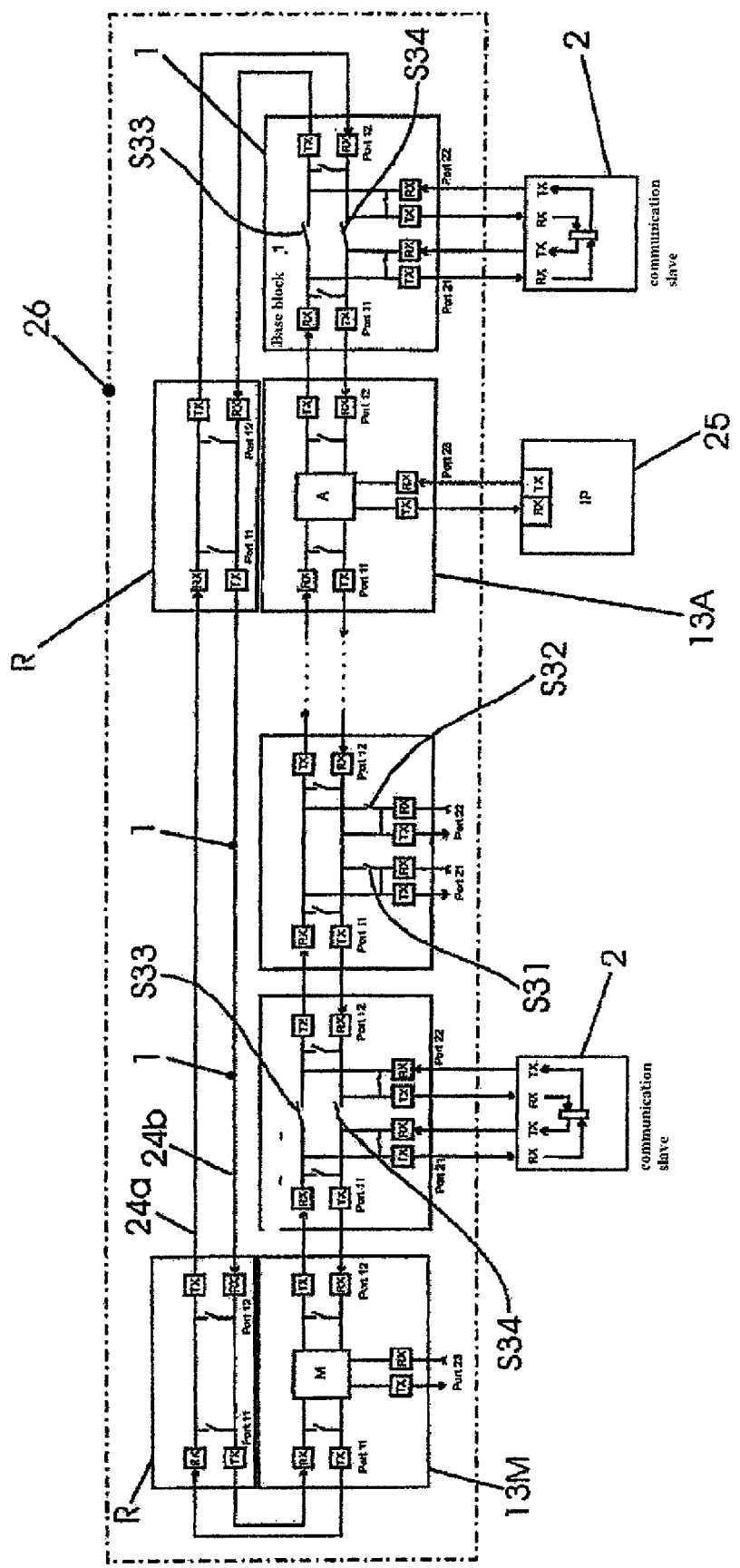
FIG. 6A shows a schematic flow diagram of a double ring communication network with switchable real time Ethernet connections.

According to FIG. 6A the communication system shown here consists of a real time Ethernet field bus in a double ring structure with a communication master, which is responsible for the bus and communication management. According to the embodiment shown the communication master is realised by means of a master coupling means 13M (see FIG. 3M). The communication master can connect with an external communication partner, for example with a higher ranking controller or IP channel, via the transverse port 23 connected with the process assembly at that point. The field bus further comprises a plurality of network nodes 2, which actively participate in the communication with the relevant double ports 21, 22 via the relevant switching device 1 (see FIG. 2). The communication is organised in ring form, e.g. the data sent by the communication master 13M will be returned to the master coupling means 13M following receipt of the same by all other network nodes 2, e.g. communication slaves. In each part section between individual network nodes data can be simultaneously transmitted in both directions. The two opposing data transmission channels are represented in FIG. 6A by the two line pairs 24a, 24b. Thanks to the principles of Ethernet physics, according to which electrical differential signals are transmitted, two electric lines are actually physically required for one data transmission direction. The double ring structure results in that the two parallel opposing part sections from node/user 2 to node/user 2 (part slaves) are laid from the communication master 13M, and then back via the two repeaters R to the master. Thanks to this double ring structure the field bus is equipped with a tolerance against individual faults and individual breakdowns (for example cable breakages or user breakdowns) within the logical ring communication, as is known in principle. However, during a longer interruption only those users would be contactable that each lie between the master and the nearest interruption, but not those located between two interruptions. In addition the switching off, e.g. separating of several users can no longer be tolerated with the known double ring structures, as the overall system is severely affected. This can however become necessary with large bus structures that extend over a great area.

According to FIG. 6A switching devices 1 of the invention according to FIG. 2 are included in the double ring structure as switchable outputs, where communication slaves are connected as active communication users and network nodes 2. The connection is realised via the transverse ports 21, 22. For connecting an IP channel 25 or suchlike the ring chain is further integrated into a coupling means 13A with an embedded PC as process assembly A. Although a double transverse port 21, 22 of a switching device 1 is left free according to the embodiment shown, e.g. as long as no communication user is connected with the same, the double ring structure remains available for communication without restriction. The longitudinal breaker switches S33, S34 described with reference to FIG. 2 are closed in the absence of communication users, whilst the transverse breaker switches S31, S32 are open as shown in FIG. 6A for the switching device 1 with the free double port 21, 22, and therefore interrupt. The maintenance of the double ring structure would also be ensured at the double port 21, 22 during a node/user breakdown. However, the switching device 1 with the connected functional users 2 (communication slaves) are in a switched condition in which the longitudinal breaker switches S33, S34 are open, e.g. interrupt. In this way an incoming, e.g. outgoing data stream is routed to the transverse ports 21, 22 in the longitudinal ports 11, 12, and therefore to the connected communication user. Thanks to this simple switching structure the switching device 1 can be realised with very simply structured logic switches, so that high availability and low maintenance requirements result.

From FIG. 6A it is also clear that any number of any communication users/network nodes 2 can be separated from the ring-shaped network simultaneously or one after the other with the principle of the invention, and that the double ring communication will nevertheless remain intact thanks to the closed longitudinal switches S33, S34 between the longitudinal ports 11, 12. All communication users/network nodes 2 are of equal value from a communication point of view: not one of them exists where a breakdown of the same would have a more critical affect on communication capability than the breakdown of another.

According to FIG. 6A a TX/RX pair of a port represents a physical Ethernet connection, which can for example be realised by means of known RJ45 plug connections. The latter can for example consist of the connection elements of a multi-port connection means 26 for active communication users/nodes 2 as indicated in FIG. 6A with the aid of the broken line. The connection means 26 is characterised by at least a plurality of switching devices 1 arranged in series within the ring structure. According to FIG. 6A an optional master coupling means 13M, a simple coupling means 13A, and/or one or more repeaters can be included in the double ring chain. Ideally all these components are located in a common housing or a common hat rail, or integrated in a similar way or by means of another construction design. It is the purpose of this connection means 26 amongst other things to maintain the flow of data within a ring structure, preferably a double ring structure, irrespective of whether the transverse ports 21, 22, 23 are connected to active communication users/nodes 2 or not. This is ensured by the switching logic of the switching device illustrated in FIGS. 1 and 2. Such a switching logic can also be implemented in the way of the processing units M and A of the coupling means 13M, 13A. Within the multi-port connection means 26 the two opposite data streams are transported chain-like in each case with or without active communication users/nodes 2 via the relevant longitudinal ports 11, 12 of the switching device 1 and coupling means 13M, 13A. For the latter the connection means forms a central point in the way of a star topology with all the advantages of the availability and maintenance associated with the same. Internally however the connection means works and/or communicates in the way of a ring topology with its advantages with regard to real time requirements.

With the multi-port connection means shown in FIG. 6A the way towards a scaleable hardware, e.g. hardware that can be nominated with a plurality of connections for external users (realised for example with the aid of an RJ45 socket) is open, for which the same can form a central start point. The IP channel 25 can also be realised with RJ45 ports, for example for access from external fault diagnostic systems (see DE-C-196 14 748). Free (double) ports 21, 22, 23 can be bridged with this switching logic, so that the redundant double ring remains intact. Using the two repeaters R shown in FIG. 6A inside the connection means 26 enables a simple installation of the return lines required for the double ring, which is also the reason for limiting the length of the lines of the Ethernet.

Within the connection means 26 also the characteristic of the receiver RX already mentioned above is important, according to which a node sets the communication flag link when an electric connection is detected, e.g. when the communication capability of the external transmitter TX is detected. The master coupling means 13M with the processor M co-ordinates the real time Ethernet field bus with the ring structure. The processor, e.g. the processor unit M can be realised with an embedded industrial PC.

Figure 6B:
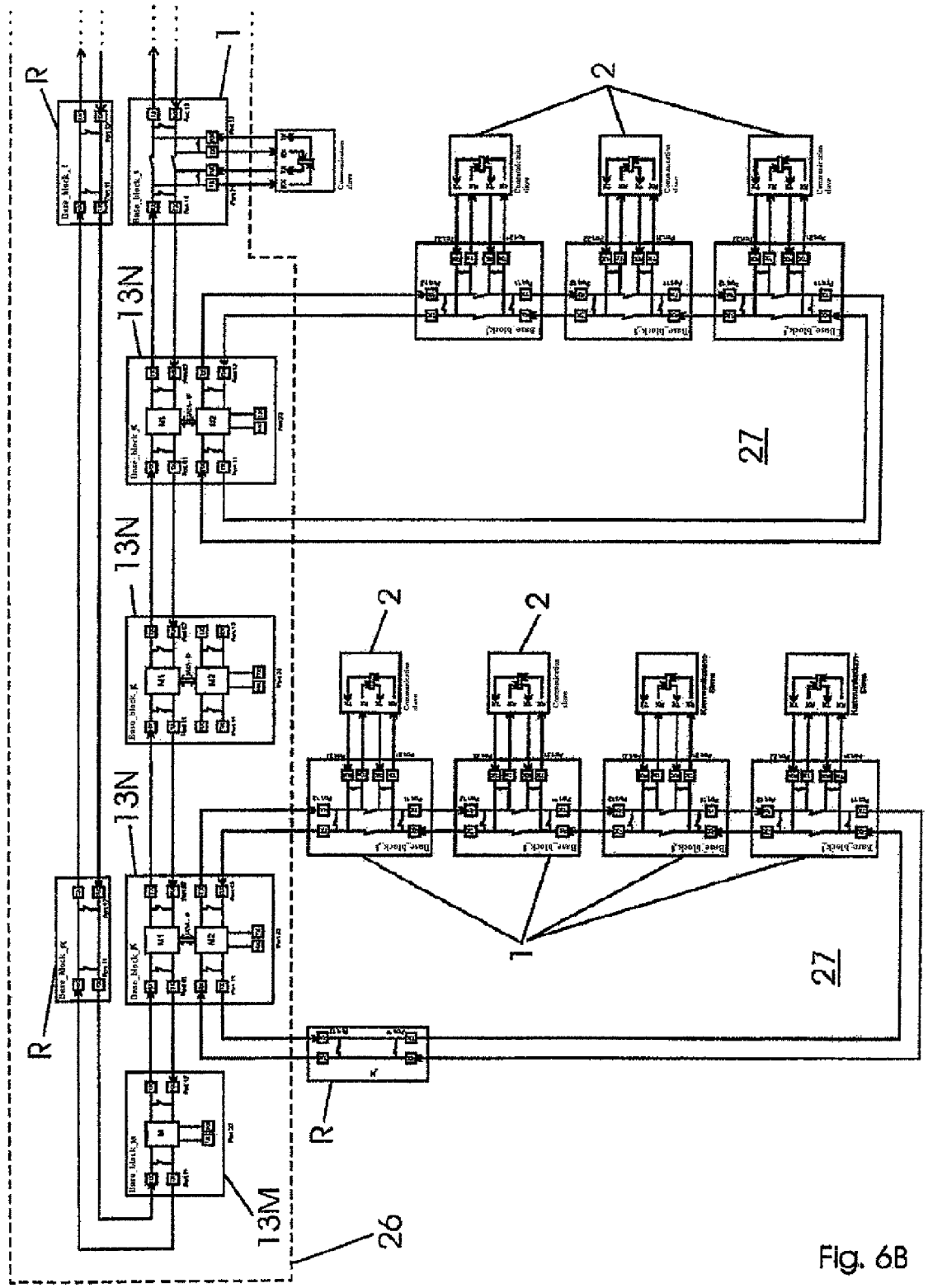
FIG. 6B shows a schematic flow diagram of a coupled double ring structure with switchable real time Ethernet connections (so-called comb structure)
Figure 6C:
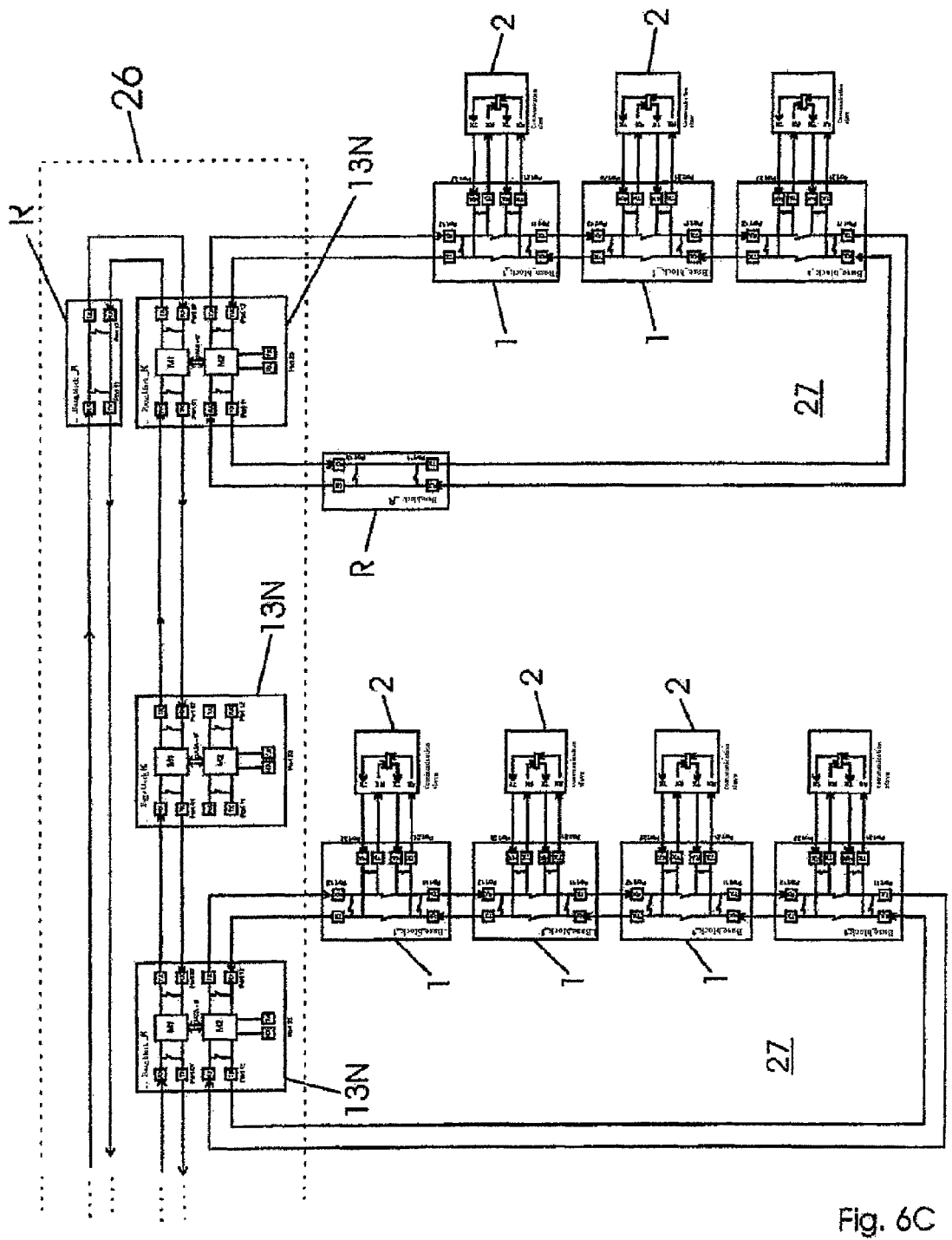
FIG. 6C shows an extension of FIG. 6B.

In order to increase resistance against breakdown of the active communication master it is sensible to maintain the function of the same more than once, e.g. to provide redundancy within the ring network. This redundancy is provided in the coupled double ring/comb structure of FIGS. 6B and 6C. Apart from the actual communication master in the form of the master coupling means 13M several network coupling means 13N are installed one behind the other, namely on the level of the multi-port coupling means 26, into the double ring structure. These can for example consist of bridge routers or suchlike for communication technically separate field bus segments 27, which can be communication rings for a plurality of electrical drives in this particular example. The network coupling means 13N enables the data transmission between the field bus segments 27 via the multi-port connection means 26. For this the data traffic can be easily restricted to the absolutely necessary, whilst an unnecessary transmission of data between two different segments 27 does not need to occur. Otherwise all characteristics and features of the structure described with reference to 6A also apply here. With the embodiment shown in FIGS. 6B and 6C the requirements of comprehensive industrial communication systems are catered for, where it is sensible to communication technically separate several field bus segments 27 from each other, and to only exchange necessary data and information via the "bridge router" in the form of the network coupling means 13N. As the latter is equipped with a plurality of processor capacities as described above, which can fulfill the functions of a communication master as well as those of a communication slave, the same can replace these functions in a case where the active original communication master in the form of the master coupling means 13M breaks down. The redundancy of the communication master function therefore results from the installation of the network coupling means 13N into the ring network. The latter also enables the often desired comb structure for multiple individual electric drive systems (where transverse communication in the area of the multi-port communication means and a communication technically separate "vertical communication" takes place in the field bus segments 27).

| LIST OF REFERENCE NUMBERS | |
|---|---|
| 1 | Switching device |
| 2 | Network node |
| 3 | Longitudinal receiver |
| 4 | Transverse receiver |
| 5 | Transverse transmitter |
| 6 | Longitudinal transmitter |
| 7 | Processing unit |
| S31, S32 | Transverse breaker switch |
| Link | Communication flag |
| S33, S34 | Longitudinal breaker switch |
| 01, 02, 11, 12 | Longitudinal ports |
| 21, 22, 23 | Transverse ports |
| RX | Receiver |
| TX | Transmitter |
| S11, S12 | Loop-back switch |
| S21, S22 | Loop-back switch |
| 13A | Coupling means |
| 13M | Master coupling means |
| 13N | Network coupling means |
| A, M | Process assembly |
| DATA IF | Data interface |
| R | Repeater |
| 24a, 24b | Line pair |
| 25 | IP channel |
| 26 | Multi-port connection means |
| 27 | Field bus segment |

The invention claimed is:

1. A method for controlling the movement of a plurality of machine parts using a communication network tolerating a breakdown or decoupling of at least one network node (2), wherein the network is operated according to a closed multiple ring structure, in which each node (2) communicates with a transmitter (TX) or the port (12) of a first adjacent node (2) by means of a receiver (RX) or a first port (11) and with the receiver (RX) or the port (11) of a second adjacent network node (2) by means of a transmitter (TX) or a second port (12), and the closed ring structure is preserved in the case of a breakdown or decoupling of at least one of the nodes (2), at least one of the nodes (2) is coupled to the network via a data path switching device (1) which is actuated in the case of a breakdown or decoupling of said node (2) in such a way that the communicating nodes (2) which exist in the network and are arranged next to each other in the ring structure interact in communication by means of a relevant port (11, 12) or transmitter (TX) and receiver (RX) thereof after the breakdown or decoupling, the method comprising:

(a) operating the network on the basis of a double ring structure;

(b) communicating to and from each node (2) with each node's two nearest adjacent nodes (2) by means of two bi-directional communication ports (11, 12), each bi-directional port comprising a transmitter (TX) and a receiver (RX);

(c) using at least one switching device (1) with four bi-directional communication ports (11, 12, 21, 22) and allocating two (11, 12) of the four bi-directional communication ports to adjacent nodes (2) and allocating the other two (21, 22) of the four bi-directional communication ports to the node (2) to be coupled and used for generating communication flags (link) to indicate whether the node (2) to be coupled is capable of communication or not; and (d) controlling the switching device (1), when not capable of communication, by the communication flags (link) in such a way that the ports (21, 22) of the switching device (1) associated with the coupled node (2) or the coupled node (2) are bridged, and therefore the coupled node (2) is separated from the ring structure.

2. A method according to claim 1, wherein the network is operated according to real time requirements, and wherein a coupling device is equipped with a process assembly, and is used within the network for coupling with a data processing system, said data processing system being equipped with a communication structure that deviates from the network or running with a network topology or not being designed for real time requirements.

3. A method according to claim 2, wherein the network is operated on the basis of a real time Ethernet or the data processing system is operated on the basis of a non real time and wherein the process assembly is used for supplying standard Ethernet data telegrams or data according to Internet protocol from the data processing system to the network in such a way that a real time data transmission within the network is not interrupted.

4. A method according to claim 3, wherein the network is operated on a basis of the master/slave principle, and wherein a master coupling device is equipped with a process assembly which is used as a communication master within the network.

5. A method according to claim 4, wherein a network coupling device (13N) is equipped with a plurality of process assemblies (M1, M2) to be used with a similarly structured or functioning adjacent network for coupling with the network.

6. A method according to claim 5, wherein the network coupling device (13N) is equipped with at least two process assemblies (M1, M2) which are operated for an opposite data exchange, and are used as nodes of the network for one, and as nodes for the adjacent network for the other.

7. A method according to claim 6, wherein the network is operated on the basis of the master/slave principle, and the process assemblies (M1, M2) are used as communication master or as communication slave.

8. A method according to claim 7, wherein the network is operated with serial data transmission.

* * * * *